(12) United States Patent
Nakamura et al.

(10) Patent No.: US 7,601,669 B2
(45) Date of Patent: Oct. 13, 2009

(54) POWDERY CATALYST, EXHAUST-GAS PURIFYING CATALYZER, AND POWDERY CATALYST PRODUCTION METHOD

(75) Inventors: Masanori Nakamura, Yokosuka (JP); Hironori Wakamatsu, Yokosuka (JP); Katsuo Suga, Yokohama (JP); Toru Sekiba, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 287 days.

(21) Appl. No.: 10/584,243

(22) PCT Filed: Nov. 29, 2004

(86) PCT No.: PCT/JP2004/018082

§ 371 (c)(1),
(2), (4) Date: Jun. 23, 2006

(87) PCT Pub. No.: WO2005/063390

PCT Pub. Date: Jul. 14, 2005

(65) Prior Publication Data

US 2007/0153390 A1    Jul. 5, 2007

(30) Foreign Application Priority Data

Dec. 25, 2003  (JP)  ............. P2003-430713

(51) Int. Cl.
*B01J 23/00* (2006.01)
*B01J 21/00* (2006.01)

(52) U.S. Cl. ............ 502/326; 502/261; 502/262; 502/327; 502/332; 502/333; 502/334; 502/339; 502/355; 502/415; 502/439

(58) Field of Classification Search ............ 502/261, 502/262, 326, 327, 332, 333, 334, 339, 355, 502/415, 439
See application file for complete search history.

(56) References Cited

U.S. PATENT DOCUMENTS

| | | |
|---|---|---|
| 2,980,662 A | 4/1961 | Jezl |
| 3,255,020 A | 6/1966 | Ferrell |
| 3,266,477 A | 8/1966 | Stiles |
| 3,271,322 A | 9/1966 | Stiles |
| 3,357,916 A | 12/1967 | Smith |
| 3,388,077 A | 6/1968 | Hoekstra |
| 3,478,329 A | 11/1969 | Etienne De Rudnay |

(Continued)

FOREIGN PATENT DOCUMENTS

EP    0 466 984 A1    1/1992

(Continued)

OTHER PUBLICATIONS

M. Nakamura et al., US PTO Notice of Allowance, U.S. Appl. No. 10/589,890, dated May 7, 2009, 13 pgs.

(Continued)

*Primary Examiner*—Cam N Nguyen
(74) *Attorney, Agent, or Firm*—Foley & Lardner LLP

(57) ABSTRACT

In a powdery catalyst (1), a porous carrier (2) has a complex part (3) configured to hold a noble metal particle (4), the complex part being composed of a transition metal material and a constituent material of the porous carrier (2).

4 Claims, 4 Drawing Sheets

U.S. PATENT DOCUMENTS

| | | | |
|---|---|---|---|
| 3,531,329 A | | 9/1970 | Selwitz |
| 3,649,566 A | | 3/1972 | Hayes et al. |
| 4,255,289 A | * | 3/1981 | Balinsky et al. ............. 502/327 |
| 4,255,290 A | | 3/1981 | Flagg et al. |
| 4,261,862 A | | 4/1981 | Kinoshita et al. |
| 4,274,981 A | | 6/1981 | Suzuki et al. |
| 4,369,132 A | | 1/1983 | Kinoshita et al. |
| 4,374,046 A | | 2/1983 | Antos |
| 4,425,261 A | | 1/1984 | Stenius et al. |
| 4,440,874 A | | 4/1984 | Thompson |
| 4,444,721 A | | 4/1984 | Ohkata |
| RE31,719 E | | 10/1984 | Sonetaka et al. |
| 4,495,304 A | | 1/1985 | Yoo et al. |
| 4,539,311 A | | 9/1985 | Harrison et al. |
| 4,548,921 A | | 10/1985 | Geus et al. |
| 4,585,752 A | * | 4/1986 | Ernest ........................ 502/304 |
| 4,714,693 A | | 12/1987 | Targos |
| 4,716,087 A | | 12/1987 | Ito et al. |
| 4,738,947 A | | 4/1988 | Wan et al. |
| 4,758,418 A | | 7/1988 | Yoo et al. |
| 4,765,874 A | | 8/1988 | Modes et al. |
| 4,793,797 A | | 12/1988 | Kato et al. |
| 4,839,146 A | | 6/1989 | Cho et al. |
| 4,857,499 A | * | 8/1989 | Ito et al. ..................... 502/326 |
| 4,904,633 A | | 2/1990 | Ohata et al. |
| 4,969,265 A | | 11/1990 | Ehara |
| 5,039,647 A | * | 8/1991 | Ihara et al. .................. 502/251 |
| 5,068,218 A | | 11/1991 | Nishizawa |
| 5,108,469 A | | 4/1992 | Christ |
| 5,112,787 A | | 5/1992 | Falke et al. |
| 5,122,496 A | | 6/1992 | Vorlop et al. |
| 5,248,650 A | | 9/1993 | Sekiba et al. |
| 5,318,757 A | | 6/1994 | Abe et al. |
| 5,395,406 A | | 3/1995 | Clavenna et al. |
| 5,427,989 A | | 6/1995 | Kanesaka et al. |
| 5,446,003 A | | 8/1995 | Augustine et al. |
| 5,516,741 A | | 5/1996 | Gascoyne et al. |
| 5,610,117 A | | 3/1997 | Horiuchi et al. |
| 5,622,048 A | | 4/1997 | Aoyama et al. |
| 5,640,847 A | | 6/1997 | Nakajima et al. |
| 5,644,912 A | | 7/1997 | Kawamura |
| 5,677,258 A | | 10/1997 | Kurokawa et al. |
| 5,750,458 A | | 5/1998 | Kennelly et al. |
| 5,814,576 A | | 9/1998 | Yamamoto |
| 5,814,577 A | | 9/1998 | Park et al. |
| 5,849,660 A | | 12/1998 | Takemoto et al. |
| 5,911,961 A | | 6/1999 | Horiuchi et al. |
| 5,916,839 A | | 6/1999 | Pak et al. |
| 5,977,012 A | | 11/1999 | Kharas et al. |
| 6,047,544 A | | 4/2000 | Yamamoto et al. |
| 6,057,263 A | | 5/2000 | Takahashi et al. |
| 6,066,410 A | | 5/2000 | Auer et al. |
| 6,066,587 A | | 5/2000 | Kurokawa et al. |
| 6,069,111 A | | 5/2000 | Yamamoto et al. |
| 6,080,371 A | | 6/2000 | Tanabe et al. |
| 6,083,467 A | | 7/2000 | Takeshima et al. |
| 6,107,239 A | * | 8/2000 | Qin et al. .................... 502/300 |
| 6,110,862 A | | 8/2000 | Chen et al. |
| 6,172,000 B1 | | 1/2001 | Chattha et al. |
| 6,180,075 B1 | | 1/2001 | Lindner et al. |
| 6,221,805 B1 | | 4/2001 | Yamashita et al. |
| 6,228,800 B1 | | 5/2001 | Yamaguchi et al. |
| 6,284,201 B1 | | 9/2001 | Buck |
| 6,296,813 B1 | | 10/2001 | Ishii et al. |
| 6,306,794 B1 | | 10/2001 | Suzuki et al. |
| 6,335,305 B1 | | 1/2002 | Suzuki et al. |
| 6,370,870 B1 | | 4/2002 | Kamijo et al. |
| 6,440,378 B1 | * | 8/2002 | Hirata et al. ............. 423/239.1 |
| 6,444,610 B1 | | 9/2002 | Yamamoto |
| 6,475,446 B1 | | 11/2002 | Horiike et al. |
| 6,503,862 B1 | | 1/2003 | Yamamoto |
| 6,511,642 B1 | | 1/2003 | Hatanaka et al. |
| 6,514,905 B1 | | 2/2003 | Hanaki et al. |
| 6,518,213 B1 | | 2/2003 | Yamamoto et al. |
| 6,569,803 B2 | | 5/2003 | Takeuchi |
| 6,589,901 B2 | | 7/2003 | Yamamoto et al. |
| 6,623,716 B2 | | 9/2003 | Suga et al. |
| 6,660,897 B1 | | 12/2003 | Martchal-George et al. |
| 6,680,279 B2 | | 1/2004 | Cai et al. |
| 6,729,125 B2 | | 5/2004 | Suga et al. |
| 6,756,336 B2 | | 6/2004 | Kasahara et al. |
| 6,764,665 B2 | | 7/2004 | Deeba et al. |
| 6,787,500 B2 | | 9/2004 | Ito et al. |
| 6,800,388 B2 | | 10/2004 | Kaneko et al. |
| 6,861,387 B2 | | 3/2005 | Ruth et al. |
| 6,887,443 B2 | | 5/2005 | Suga et al. |
| 6,887,444 B1 | | 5/2005 | Yamamoto |
| 6,896,857 B2 | | 5/2005 | Nakamura et al. |
| 6,926,875 B2 | | 8/2005 | Hatanaka et al. |
| 6,956,007 B2 | * | 10/2005 | Cai et al. .................... 502/303 |
| 6,967,183 B2 | | 11/2005 | Hampden-Smith et al. |
| 7,029,514 B1 | * | 4/2006 | Yang et al. ..................... 75/348 |
| 7,041,866 B1 | | 5/2006 | Gillespie |
| 7,081,431 B2 | | 7/2006 | Yamashita et al. |
| 7,150,861 B2 | | 12/2006 | Morita et al. |
| 7,351,679 B2 | | 4/2008 | Eri et al. |
| 2001/0004832 A1 | | 6/2001 | Hanaki et al. |
| 2001/0006934 A1 | | 7/2001 | Kachi et al. |
| 2001/0021358 A1 | | 9/2001 | Kikuchi et al. |
| 2002/0045543 A1 | | 4/2002 | Takatori et al. |
| 2003/0004054 A1 | | 1/2003 | Ito et al. |
| 2003/0083193 A1 | | 5/2003 | Takaya et al. |
| 2003/0167752 A1 | | 9/2003 | Niwa et al. |
| 2003/0181316 A1 | | 9/2003 | Hiramoto et al. |
| 2004/0055280 A1 | | 3/2004 | Nishizawa et al. |
| 2004/0254069 A1 | | 12/2004 | Ito |
| 2005/0170958 A1 | | 8/2005 | Kikuchi et al. |
| 2005/0215429 A1 | | 9/2005 | Wakamatsu et al. |
| 2005/0221978 A1 | | 10/2005 | Shiratori et al. |
| 2007/0155626 A1 | | 7/2007 | Yasuda et al. |
| 2007/0167319 A1 | | 7/2007 | Shiratori et al. |
| 2007/0203021 A1 | | 8/2007 | Nakamura et al. |
| 2007/0244001 A1 | | 10/2007 | Wakamatsu et al. |

FOREIGN PATENT DOCUMENTS

| | | |
|---|---|---|
| EP | 0 931 590 B1 | 7/1999 |
| EP | 0 940 176 A2 | 9/1999 |
| EP | 1 043 065 A1 | 10/2000 |
| EP | 1 494 304 A1 | 1/2005 |
| JP | 56-010333 A | 2/1981 |
| JP | 58-186441 A | 10/1983 |
| JP | 07-246343 A | 12/1984 |
| JP | 59-230639 | 12/1984 |
| JP | 59-230639 A | 12/1984 |
| JP | 9-122492 A | 5/1997 |
| JP | 10-216517 A | 8/1998 |
| JP | 11-057473 A | 3/1999 |
| JP | 11-314035 A | 11/1999 |
| JP | 2000-001119 A | 1/2000 |
| JP | 2000-015098 A | 1/2000 |
| JP | 2000-042411 A | 2/2000 |
| JP | 2000-279824 A | 10/2000 |
| JP | 2000-296339 | 10/2000 |
| JP | 2001-198466 A | 7/2001 |
| JP | 3251009 B2 | 11/2001 |
| JP | 2002-066335 A | 3/2002 |
| JP | 2002-102703 A | 4/2002 |
| JP | 2002-233755 A | 8/2002 |
| JP | 2002-355558 A | 12/2002 |
| JP | 2002-361086 A | 12/2002 |
| JP | 2003-080077 A | 3/2003 |
| JP | 2003-126694 A | 5/2003 |
| JP | 2003-144923 A | 5/2003 |

| | | | |
|---|---|---|---|
| JP | 2003-164764 A | 6/2003 | |
| JP | 2003-181290 A | 7/2003 | |
| JP | 2003-181293 A | 7/2003 | |
| JP | 2003-290658 A | 10/2003 | |
| JP | 2003-290667 A | 10/2003 | |
| JP | 2003-311128 A | 11/2003 | |
| JP | 2004-016838 A | 1/2004 | |
| JP | 2004-043217 A | 2/2004 | |
| JP | 2004-82000 | 3/2004 | |
| JP | 2004-174490 A | 6/2004 | |
| JP | 2004-267961 A | 9/2004 | |
| JP | 2004-267961 A | 9/2004 | |
| JP | 2005-081183 A | 3/2005 | |
| JP | 2005-81183 A | 3/2005 | |
| JP | 2005-305300 A | 11/2005 | |
| WO | WO 95/32790 | 12/1995 | |
| WO | WO-97/09114 A1 | 3/1997 | |
| WO | WO-2005/063390 A1 | 7/2005 | |
| WO | WO-2005/063391 A1 | 7/2005 | |

OTHER PUBLICATIONS

U.S. Appl. No. 11/722,275, Jun. 20, 2007, Nakamura et al.

A. Martinez-Arias et al., "Study of the lean NOx reduction with C3H6 in the presence of water over silver/alumina catalysts prepared from inverse microemulsions," Applied Catalysts B: Environmental, vol. 28, 2000, pp. 29-41.

H. Wakamatsu et al., US PTO Office Action U.S. Appl. No. 11/578,295, Mar. 19, 2009, 8 pgs.

H. Wakamatsu et al., US PTO Office Action U.S. Appl. No. 11/578,295, Oct. 2, 2008, 15 pgs.

H. Wakamatsu, et al., US PTO Office Action U.S. Appl. No. 11/079,270, Mar. 4, 2009, 6 pgs.

H. Wakamatsu, et al., US PTO Office Action U.S. Appl. No. 11/079,270, May 12, 2008, 7 pgs.

H. Wakamatsu, et al., US PTO Office Action U.S. Appl. No. 11/079,270, Jul. 21, 2008, 5 pgs.

H. Wakamatsu, et al., US PTO Office Action U.S. Appl. No. 11/079,270, Aug. 25, 2008, 20 pgs.

H. Yasuda et al., US PTO Office Action U.S. Appl. No. 10/586,533, dated Jul. 14, 2008, 6 pgs.

H. Yasuda et al., US PTO Office Action U.S. Appl. No. 10/586,533, dated Nov. 18, 2008, 16 pgs.

K. Shiratori, et al., US PTO Office Action U.S. Appl. No. 10/584,346, dated Jul. 11, 2008, 5 pgs.

K. Shiratori, et al., US PTO Office Action U.S. Appl. No. 10/584,346, dated Nov. 18, 2008, 19 pgs.

K. Shiratori, et al., US PTO Office Action U.S. Appl. No. 11/079,377, dated Mar. 12, 2009, 7 pgs.

K. Shiratori, et al., US PTO Office Action U.S. Appl. No. 11/079,377, dated May 08, 2008, 6 pgs.

K. Shiratori, et al., US PTO Office Action U.S. Appl. No. 11/079,377, dated Jul. 28, 2008, 18 pgs.

M. Che et al., "A Study of the Chemisorption of Nitric Oxide on PdY Zeolite, Evidence for a Room Temperature Oxidative Dissolution of Pd Crystallities," The Journal of Physical Chemistry, vol. 60, No. 21, 1976, 11 pgs.

M. Nakamura et al., US PTO Office U.S. Appl. No. 10/589,890, dated Jul. 15, 2008, 5 pgs.

M. Nakamura et al., US PTO Office U.S. Appl. No. 10/589,890, dated Nov. 19, 2008, 13 pgs.

PH. Buffat and J-P Borel, "Size effect on the melting temperature of gold particles," Physical Review A, Jun. 1976, vol. 13, No. 6, 12 pgs.

R. Willis, "Pumice, Porous Volcanic Rock," Online, XP002364316, URL:http://ceramic-materials.com/cermat/material/2009.html>.

S. Eriksson, et al., "Preparation of Catalysts from Microemulsions and Their Applications in Heterogeneous Catalysis," Applied Catalysis A: General, vol. 265, No. 2, Jul. 8, 2004, pp. 207-219.

T. Kinoshita et al., "Magnetic evaluation of nanostructure of gold—iron composite particles synthesized by a reverse micelle method," Journal of Alloys and Compounds, vol. 359, No. 1-2, Sep. 22, 2003, pp. 46-50.

T. Shimizu et al., "Size Evolution of Alkanethiol-Protected Gold Nanoparticles by Heat Treatment in the Solid State", J. Phys. Chem. B, 107, 2003, pp. 2719-2724.

W.Y. Kim et al., "Methanol synthesis from syngas over supported palladium catalysts prepared using water-in-oil microemulsion," Applied Catalysis A: General, vol. 169, 1998, pp. 157-164.

* cited by examiner

POWDERY CATALYST, EXHAUST-GAS PURIFYING CATALYZER, AND POWDERY CATALYST PRODUCTION METHOD

TECHNICAL FIELD

The present invention relates to a powdery catalyst, and in particular, to a powdery catalyst for purification of exhaust gases of internal combustion engine containing nitrogen oxides and the like, as well as to an exhaust-gas purifying catalyzer employing the same, and a powdery catalyst production method for producing the same.

BACKGROUND ART

The regulation to exhaust gases of vehicle is spread worldwide. Exhaust gases contain hydrocarbons (HC's), carbon monoxide (CO), and nitrogen oxides (NOx), for purification of which is employed a ternary powdery catalyst in which a porous carrier, such as alumina ($Al_2O_3$), carries particles of (a) noble metal(s), such as platinum (Pt), palladium (Pd), and rhodium (Rh).

Noble metals provide a catalysis, which promotes associated reactions as a contact reaction on an exposed surface of noble metal. For a noble metal particle, the activity of catalysis is thus proportional to the surface area. To provide a small amount of noble metal particles with a maximized catalytic activity, such particles should be prepared possibly small in size, to be high of specific surface area, and evenly dispersed over a carrier, with their small sizes maintained.

Noble metal particles prepared small in size exhibit high activities in surface reaction due to great surface energy, and very unstable, so that they tend to agglomerate when brought close. In particular, Pt particles have a remarkable tendency to sinter when heated, and even if dispersed on a carrier, they can be sintered to be large in size, with reduced catalytic activities. For vehicle-oriented catalysts, which are exposed to hot temperatures, typically within 800° C. to 900° C. and sometimes over 1000° C., it is difficult to hold particle size of noble metals prepared.

To control agglomeration of noble metal particles, one may reduce the surface energy. However, for such reduction to be effective, noble metal particles should be so great as 50 nm or 100 nm in size. Such a great size of noble metal particle fails to provide a sufficient catalytic activity.

An alternate measure is the use of an anchor for anchoring a noble metal particle on a carrier.

Japanese Patent Application Laid-Open Publication No. 59-230639 has disclosed a catalyzer in which a honeycomb substrate carries an activated alumina, which has held thereon, for carrying, particles of at least one of cerium (Ce), zirconium (Zr), iron (Fe), and nickel (Ni), at least one of neodymium (Nd), lanthanum (La), and praseodymium (Pr), as necessary, and at least one of Pt. Pd and Rh.

DISCLOSURE OF INVENTION

In this composition, particles of noble metal (Pt, Pd, Rh) fails in majority to contact with particles of transition metal (Ce, Zr, Fe, Ni), so that the majority of the former is left unanchored by the latter, and is uncontrollable against agglomeration.

The present invention has been achieved in view of such points. It therefore is an object of the invention to provide a powdery catalyst controllable against agglomeration, and excellent in durability. It also is an object of the invention to provide an exhaust gas purifying catalyzer employing such a powdery catalyst, and a powdery catalyst production method for producing such a powdery catalyst.

To achieve the object, according to an aspect of the invention, a powdery catalyst comprises a noble metal particle, and a porous carrier provided with a complex part configured to hold the noble metal particle, the complex part comprising a composite of a transition metal material, and a constituent material of the porous carrier.

According to another aspect of the invention, an exhaust-gas purifying catalyzer comprises a powdery catalyst according to the above-noted aspect, and a substrate carrying the powdery catalyst.

According another aspect of the invention, a powdery catalyst production method comprises preparing a noble metal particle, preparing a porous carrier, and providing the porous carrier with a complex part comprising a composite of a transition metal material and a constituent material of the porous carrier, holding the noble metal particle by the complex part.

The above and further objects, features, and advantages of the invention will fully appear from the best mode for carrying out the invention, when the same is read in conjunction with the accompanying drawings.

BEST MODE FOR CARRYING OUT THE INVENTION

There will be detailed embodiments of the invention.

(Powdery Catalyst)

Description is now made of a powdery catalyst according to an embodiment of the invention. The powdery catalyst comprises a noble metal particle, and a porous carrier provided with a complex part configured to hold the noble metal particle, the complex part comprising a transition metal material, and a constituent material of the porous carrier.

Figure 1:
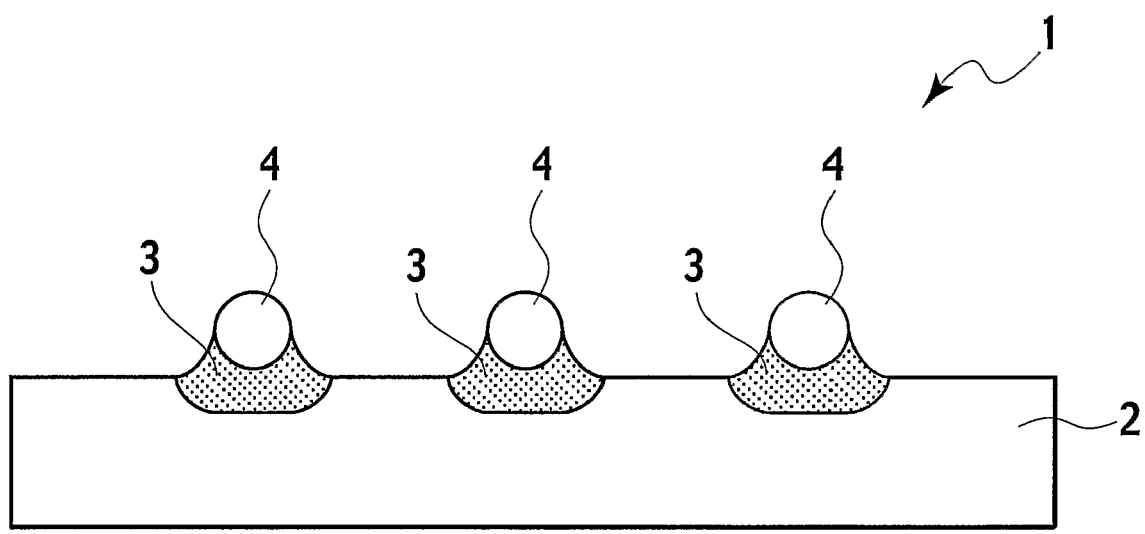
FIG. 1 is a section of a powdery catalyst according to an embodiment of the invention.

As illustrated in FIG. 1, in a powdery catalyst 1 according to the embodiment, a porous carrier 2 has at a surface thereof multiple complex parts 3 each formed therein as a complex (or composite) of a transition metal material (i.e. one or more transition metals) and an associated part of the porous carrier 2 (i.e. one or more oxides as a constituent material thereof), whereby the transition metal material is kept stable on the porous carrier 2. Each complex part 3 has a noble metal particle 4 (i.e. particle of one or more noble metals) held thereto, so that the noble metal particle 4 is hardly removed from a surface of complex part 3. The complex part 3, formed as a complex of transition metal and porous carrier, thus serves as an anchor of the noble metal particle 4, preventing agglomeration (e.g. sintering when heated) of noble metal. The noble metal particle can thus be prepared in a fine size, allowing a prevented sintering, without employing a great size with which the noble metal may fail to exhibit the catalytic activity. The complex part 3 may well be a complex of simple oxide, complex oxide, or alloy.

The material to constitute an anchor may well be a metal (preferably, a transition metal) that can form a stable complex 3 with the porous carrier 2. More specifically, it is desirable for the noble metal particle 4 to be composed of one or more noble metals selected from among ruthenium, rhodium, palladium, silver, iridium, platinum, and gold, for the transition metal material to be composed of one or more transition metals selected from among manganese, iron, cobalt, nickel, copper, and zinc, and for the porous carrier 2 to be composed of one or more porous oxides selected from among alumina, silica, titanium oxide, silica alumina, and zeolite. It is more desirable for the noble metal particle 4 to be composed of platinum, for the transition metal material to be cobalt, for the porous carrier 2 to be composed of an alumina, and for the complex part 3 to be cobalt aluminate. In the case of cobalt aluminate formed by cobalt and alumina, platinum is fixed to the surface of cobalt aluminate, and kept from agglomeration.

The powdery catalyst 1 comprises the porous carrier 2, and a whole set of noble metal particles 4 dispersed thereon. The porous carrier 2 has a whole set of complex parts 3 holding a major subset of the set of noble metal particles 4, and the rest as a remaining part carrying a minor subset of the set of noble metal particles 4.

The noble metal thus reside on the complex part 3 working as an anchor. As many noble metal particles as possible, preferably 80% or more of whole noble metal particles of the powdery catalyst, are preferably located on the complex parts 3.

When noble metal and transition metal are mixed and brought as fine particles on the porous carrier 2, the noble metal preferably should have an average particle diameter within a range of 0.5 nm to 20 nm. An average particle diameter range under 0.5 nm leads to higher surface energy, so that agglomeration is uncontrollable by anchoring only. Meanwhile, an average particle diameter range over 20 nm reduces catalytic activities. Thus, when particle diameters of noble metal carried on the porous carrier 2 ranges within 0.5 nm to 20 nm, preferably within 3 nm to 8 nm, surface energy and catalytic activities are balanced, and agglomeration seldom occurs even when heated, allowing for a maintained durability.

Noble metal particles 4 are distributed, of which state is shown by a dispersity. The dispersity means a surface to bulk ratio of a catalytic metal, which typically is proportional to an average particle diameter of the catalytic metal. After fine particles are placed on a porous carrier, this catalyst is subjected to a firing at 400° C. for 1 hour, when a noble metal dispersity X1 is measured, and to a firing at 700° C. for 1 hour, when a noble metal dispersity X2 is measured. Then, a ratio of X2 to X1 is checked, which preferably should be 0.7 or more. Since catalytic reactions occur substantially on the surface of noble metal, the proportion of exposed noble metal atoms at surfaces of a catalyst is essential to preparation of the catalyst. One typical method of determining the exposure is a measurement of an amount of chemical adsorption to a noble metal, followed by calculation of a dispersity of the noble metal. It is seen from the dispersity that the catalyst has a significantly decreased heat resistance, as the degree of catalysis deterioration is increased. It therefore is desirable that, between a dispersity upon preparation of a catalyst and a dispersity after endurance test, the reduction of dispersity is kept under a reference value of 0.3. If it exceeds the reference value, the catalyst may have a remarkably reduced durability.

The transition metal in the powdery catalyst preferably should be in contact with one or more elements selected from among cerium, lanthanum, zirconium, praseodymium, and neodymium. Cerium and lanthanum are preferable in consideration of catalytic activity or heat resistance of carrier, while zirconium is preferable in consideration of heat resistance of cerium. When contacting with such elements, the transition metal has an enhanced heat resistance. Such elements may be better located at interfaces between porous carrier and transition metal, rather than in the porous carrier.

(Powdery Catalyst Production Method)

Description is now made of a powdery catalyst production method according to an embodiment of the invention. The powdery catalyst production method comprises preparing a noble metal particle, preparing a porous carrier, and providing the porous carrier with a complex part comprising a composite of a transition metal material and a constituent material of the porous carrier, holding the noble metal particle by the complex part.

The powdery catalyst production method preferably comprises preparing a fine particle within a size range of 0.1 nm to 100 nm, the fine particle comprising the noble metal particle and the transition metal material, placing the fine particle on the porous carrier, and firing the porous carrier to provide the porous carrier with the complex part.

In the powdery catalyst production method, the fine particle preferably has the noble metal particle covered by particles of the transition metal material.

In the powdery catalyst production method, the fine particle may preferably have a core-shell structure.

The powdery catalyst production method preferably comprises preparing a colloid comprising the fine particle covered by an organic protector in a dispersion medium, and putting the porous carrier in the dispersion medium, having the colloid placed on the porous carrier.

Figure 2:
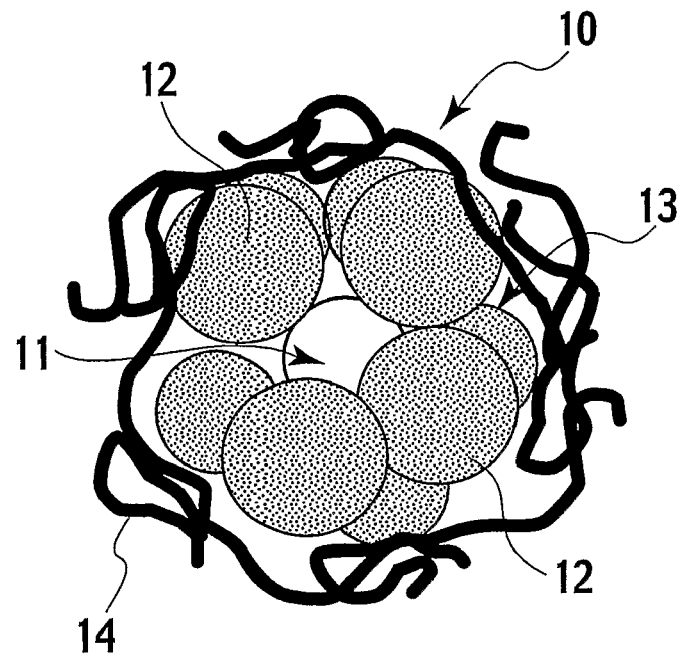
FIG. 2 is a sectional view of a colloid as a fine particle according to an embodiment of the invention.
Figure 3:
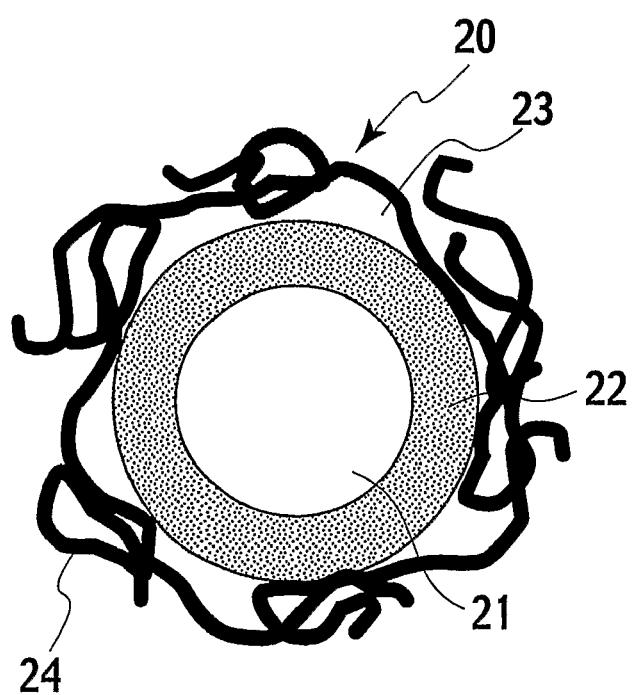
FIG. 3 is a sectional view of a colloid as a fine particle according to another embodiment of the invention.

For a complex part 3 of a porous carrier 2 and a transition metal material, to work for anchoring a noble metal particle 4, the noble metal particle 4 should be engaged with the complex part 3, wherefor as in FIG. 2 or FIG. 3, a fine particle 13 or 23, in which noble metal and transition metal are mixed, is placed on the porous carrier 2, before a drying and a firing of entirety to form the complex part 3. The fine particle 13 or 23 is sized within a range of 0.1 nm to 100 nm in average. Under 0.1 nm, it is difficult to control particle size. Over 100 nm, the fine particle may involve a greater noble metal particle than a limit size to keep a necessary catalytic activity.

In the fine particle 13, one or more noble metal particles 11 are covered or surrounded by a system of spherically arranged particles 12 of transition metal contacting therewith. In the fine particle 23, a spherical body 21 of noble metal or a set of noble metal particles is covered or enclosed by a hollow sphere or spherical layer 22 of transition metal contacting therewith.

The fine particle 13 or 23 is formed as part of a colloid 10 or 20 in a dispersion medium, such that the particle 13 or 23 is covered by a net 14 or 24 of protective organic molecules, called "organic protector". The colloid 10 or 20 is placed on a porous carrier 2, when the porous carrier 2 is put in the dispersion medium.

The powdery catalyst production method includes: reducing, by a reductant, a noble metal salt and a transition metal salt in a dispersion medium having organic protective molecules dispersed therein, forming a colloid 10 or 20 including a fine particle 13 or 23 having noble metal and transition metal mixed therein; putting a porous carrier 2 in the dispersion medium, having the colloid 10 or 20 placed on the porous carrier 2; drying the porous carrier 2 with the colloid 10 or 20 placed thereon, removing an organic protector 14 or 24 therefrom to have an exposed fine particle 13 or 23 on the porous carrier 2; and firing the porous carrier 2 with the fine particle 13 or 23 (at 400° C.), so that the transition metal first yields to intrude or impregnate into depths of an extremely irregular surface region of the porous carrier 2, having an exposed noble metal particle 4 left thereon, and then forms a composite with a constituent material (e.g. oxide) of the surface region, contracting in a bowl shape with a lapse of time, thus providing a complex part 3 (roots-like yielded and ring-like raised) to a surface of the porous carrier 2, having the noble metal particle 4 engaged therewith and held thereto.

The organic protective molecule may preferably be composed of one of polyvinylpyrrolidone, polyvinyl alcohol, oxalic acid, maleic acid, citric acid, and the like, and a mixture thereof. The dispersion medium may preferably be one of water; an alcohol, such as methanol or ethanol; an ester, such as methyl acetate ester or ethyl acetate ester; an ether, such as diethyl ether; and a mixture thereof. The noble metal salt may preferably be one of dinitro-diamine platinum, tetraammine platinum, and the like. The transition metal salt may preferably be one of cobalt acetate, cobalt nitrate, and the like. The reductant may preferably be one of hydrazine, $H_2$ gas, sodium borohydride, and the like.

FIG. 2 illustrates an exemplary structure of colloid 10, which has: a fine particle 13 involving a centered noble metal particle 11, and a surrounding system of transition metal particles 12 contacting therewith; and an enveloping system 14 of organic protective molecules nesting the fine particle 13. This structure provides colloids 10 with a controlled tendency for agglomeration in the dispersion medium, so that they are placed on a porous carrier 2 with a sufficient dispersity, to have noble metal particles 4 distributed over the porous carrier 2 with a required dispersity, for the particles 4 to be sized small, as necessary for their catalytic activities to be maintained.

Preferably, the colloid including a fine particle and organic protector should be sized 50 nm or less in average, and the fine particle involving noble metal and transition metal should be sized 5 nm or less in average. The fine particle may be an alloy, in its entirety or in part.

FIG. 3 illustrates an exemplary colloid 20, which has: a fine particle 23 of a core-shell structure involving a noble metal particle 21 as a central core, and a spherically layered transition metal particle 22 contacting therewith as an enclosing shell; and an enveloping system 24 of organic protective molecules nesting the fine particle 23. This structure allows an ensured placement of the noble metal particle 22 on a surface of deforming transition metal, when fired.

Description is now made of a method of forming a fine particle of a core-shell structure (at pp 5301-5306 of J. Phys. Chem. B, 101, 1997). This method includes: putting a prescribed amount of noble metal salt in a dispersion medium having organic protective molecules dispersed therein; controlling the medium to pH10 by NaOH; heating the medium at 160° C. for 3 hours to obtain noble metal particles; screening the particles by a membrane filter; dispersing the particles in a water solution of ethylene glycol and ethanol; blowing a hydrogen gas into the solution to effect hydrogen adsorption for 2 hours; putting a prescribed amount of transition metal salt in the solution, taking 6 hours, under a nitrogen atmosphere; and stirring the solution for 8 hours to obtain fine particles of a core-shell structure.

Figure 4:
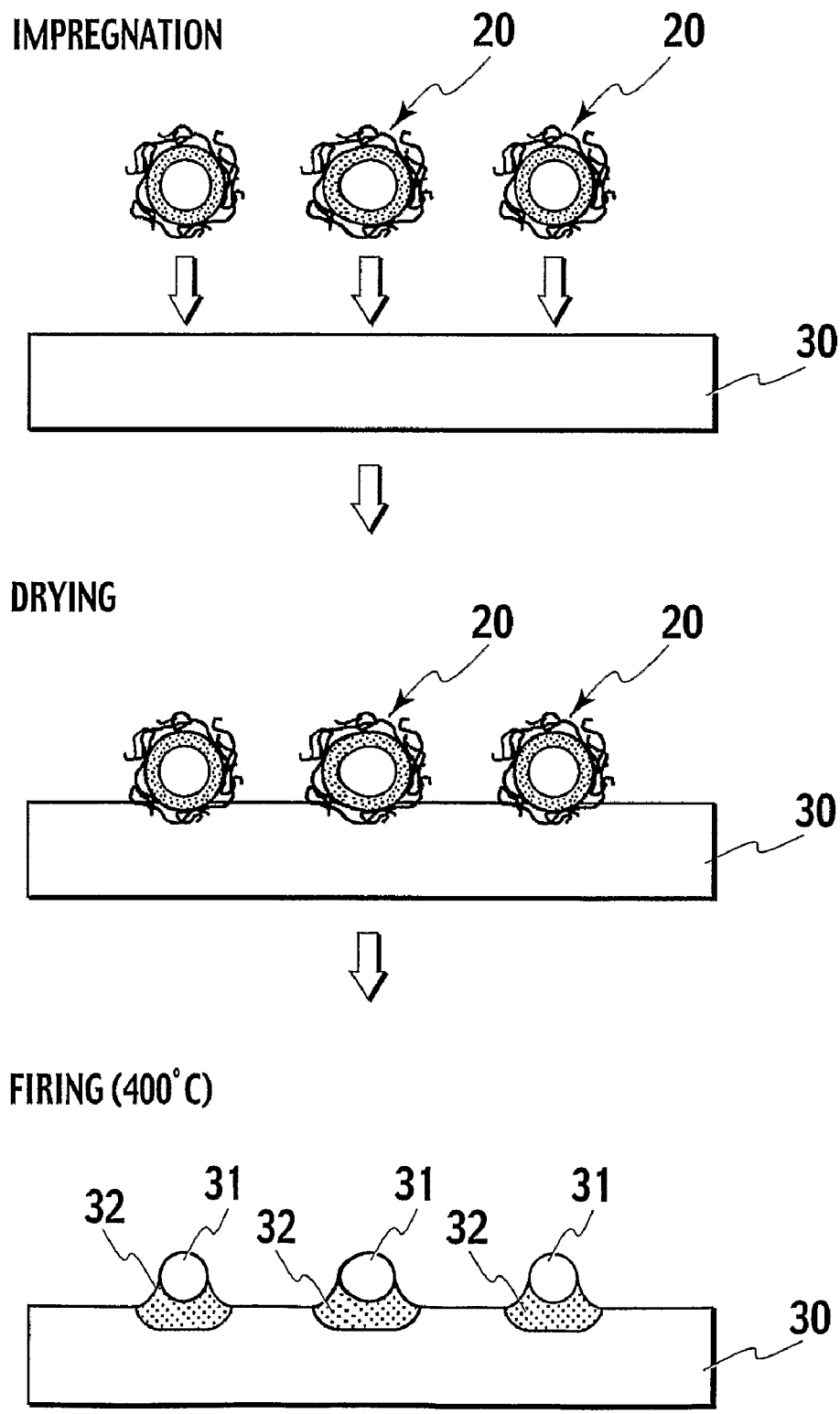
FIG. 4 is an illustration of a powdery catalyst production method according to an embodiment of the invention.

FIG. 4 illustrates principal steps of a powdery catalyst producing method according to an embodiment of the invention, which includes: preparing colloids 20 in a dispersion medium, by using fine particles of core-shell structure formed in a described manner; putting a porous carrier 30 in the medium, having colloids 20 placed on the porous carrier 30; filtering the porous carrier 30 with colloids 20 thereon; drying the porous carrier 30 with colloids 20 thereon, removing their organic protectors 24, so that fine particles of core-shell structure are placed an extremely irregular surface of the porous carrier 30; and firing the porous carrier 30 with fine particles 23 thereon, at 400° C., so that shells of transition metal each yield down, having lower parts thereof intruding into depths of the irregular surface, and upper parts thereof being dragged and slipping down along a periphery of the core as a noble metal particle 31 to be exposed, forming a composite with a constituent material of associated surface region of porous carrier 30, thus providing thereto a complex part 32 (roots-like yielded and ring-like raised), thereby holding the noble metal particle 31 engaged therewith, with a higher efficiency than the case of fine particle 13 (FIG. 2).

Figure 5:
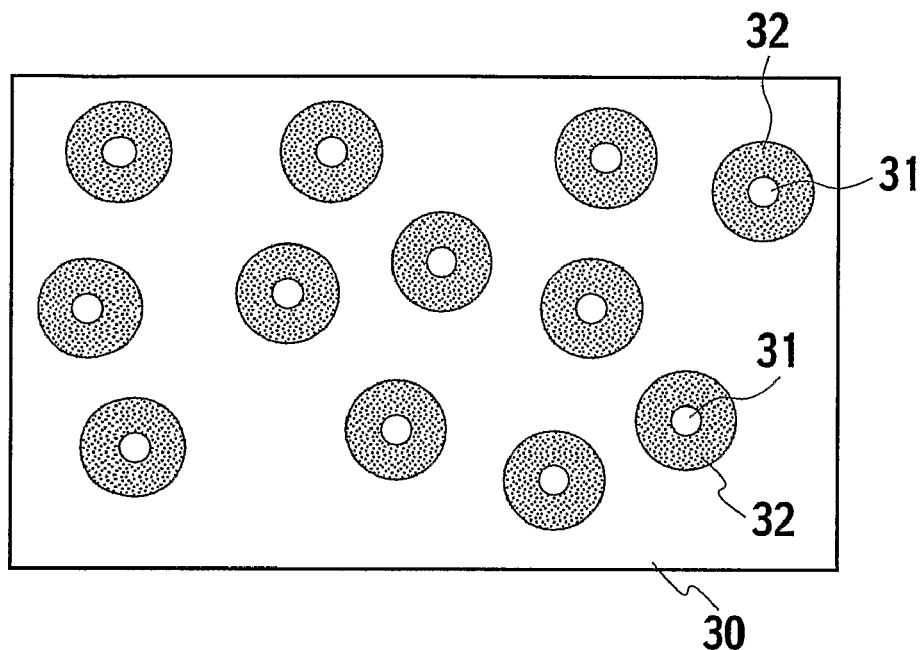
FIG. 5 is a plan of a powdery catalyst according to an embodiment of the invention.

FIG. 5 illustrates a microscopic view of a resultant distribution of noble metal particles 31 held on a system of substantially regular-shaped complex parts 32 substantially evenly dispersed over a principal surface of the porous carrier 30. As is apparent from this Figure, in this powdery catalyst, an entire set of noble metal particles 31 has a substantially whole set thereof (at least a major subset thereof) placed on and held by an entire set of complex parts 32 of the porous carrier 30, while a very minor subset of the set of noble metal particles 31 may occasionally be placed on a remaining surface portion of the porous carrier 30.

Figure 6:
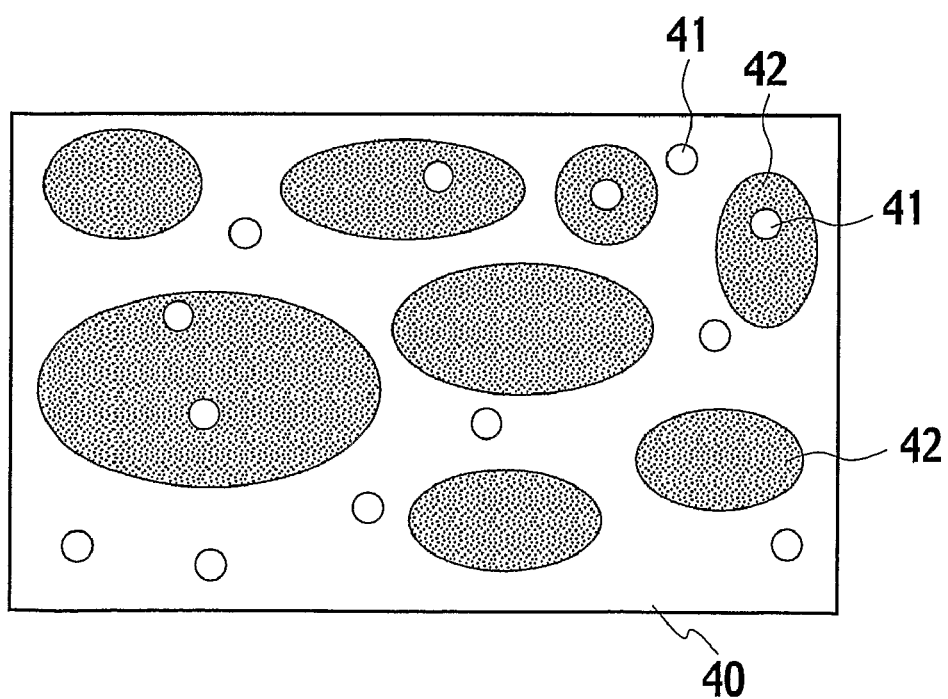
FIG. 6 is a plan of a powdery catalyst for comparison.

Contrary thereto, as shown in FIG. 6, in a powdery catalyst produced by a conventional method, a minor subset of an entire set of noble metal particles 41 is simply placed on a subset of an entire set of irregular-shaped complex parts 42 of a porous carrier 40, and a major subset of the entire set of noble metal particles 41 is uncontrollably dispersed on a remaining surface portion of the porous carrier 40.

According to the embodiment described, particles of noble metal and transition metal are mixed in the form of a fine particle of core-shell structure sized within a prescribed range, and a porous carrier with the fine particle placed thereon is fired, so that the porous carrier has a complex part formed by a constituent material thereof and the transition metal, which provides an anchoring effect to have noble metal particles individually held thereto.

(Powdery Catalyst)

Description is now made of an exhaust-gas purifying catalyzer according to an embodiment of the invention. The exhaust-gas purifying catalyzer comprises a powdery catalyst according to a described embodiment, and a substrate carrying the powdery catalyst.

The exhaust-gas purifying catalyzer may preferably contain a total quantity of noble metal particles not exceeding 0.7 g per 1 L of a volume of the substrate. It was difficult for a conventional exhaust-gas purifying catalyzer to achieve a sufficient catalytic activity with a total quantity of noble metal particles not exceeding 0.7 g per 1 L of a substrate volume, due to unavoidable agglomeration of noble metal particles.

However, according to the embodiment in which agglomeration of noble metal particles is controlled by an anchoring effect acting on individual noble metal particles, it is possible to achieve a sufficient catalytic activity with a total quantity of noble metal particles not exceeding 0.7 g per 1 L of a substrate volume.

EXAMPLES

Specific examples of powdery catalyst according to embodiments of the invention will be described below, as Example 1 through Example 4, and Comparative Example 1, to discuss the effect by kinds of materials used.

<Preparation of Specimens>

Example 1

Firstly, delivered into a mixed dispersed solution including water:ethanol=1:1 were 55 mmol of polyvinylpyrrolidone, 1.54 mmol of dinitro-diamine platinum, and 7.7 mmol of cobalt nitrate, followed by stirring. Next, added thereto was hydrazine for reduction, thereby obtaining a dispersed solution of platinum-cobalt mixed fine particles having an average particle diameter of 3.2 nm. Delivered thereinto was 10 g of alumina having a specific surface area of 200 $m^2/g$ and an average pore diameter of 20 nm, followed by stirring and by drying at 120° C. overnight. Thereafter, firing was conducted at 400° C. for 1 hour, thereby obtaining a powdery catalyst.

Example 2

Delivered into ethylene glycol were 55 mmol of polyvinylpyrrolidone and 1.54 mmol of dinitro-diamine platinum, and NaOH was dropped into it while stirring to achieve pH=10, followed by heating at 160° C. for 3 hours, thereby obtaining platinum fine particles having an average particle diameter of 2.3 nm. Next, the obtained platinum fine particles were washed by a membrane filter, and they were delivered into a solution including water:ethylene glycol:ethanol at 1:1:1, followed by bubbling of hydrogen gas for 2 hours, thereby adsorbing the hydrogen gas onto a surface of platinum. Thereafter, cobalt nitrate was delivered, followed by stirring for 5 hours, thereby obtaining platinum fine particles coated by cobalt. The obtained fine particles had an average particle diameter of 3.4 nm. Delivered into this solution was 100 g of alumina having a specific surface area of 200 $m^2/g$ and an average pore diameter of 20 nm, followed by stirring and by drying at 120° C. overnight. Thereafter, firing was conducted at 400° C. for 1 hour, thereby obtaining a powdery catalyst.

Example 3

Impregnated into the powder obtained in Example 1 were cerium acetate, lanthanum acetate, and zirconium acetate at 8.5 wt %, 5.5 wt %, and 6 wt %, respectively, when calculated as oxides relative to the powder, followed by drying at 120° C. overnight and by firing at 400° C. for 1 hour. This was a powder A. Next, impregnated into 100 g of alumina having a specific surface area of 200 $m^2/g$ and an average pore diameter of 20 nm, was zirconium acetate at 5 wt % when calculated as oxide relative to the alumina, followed by drying at 120° C. overnight and by firing at 900° C. for 4 hours. Impregnated into it was rhodium nitrate in a manner to achieve 0.3 wt %, followed by drying at 120° C. overnight and by drying at 400° C. for 1 hour. This was a powder B. Charged into a porcelain ball mill were 175 g of the powder A, 62.5 g of the powder B, 12.5 g of alumina sol, 230 g of water, and 20 g of nitric acid, followed by mixing and grinding, thereby obtaining a catalyst slurry. The obtained catalyst slurry was coated on a monolithic carrier made of cordierite (0.119L, 400 cell), and an excessive slurry within cells was removed by airflow, followed by drying at 120° C. and firing thereafter at 400° C. for 1 hour, thereby obtaining a powdery catalyst having a coating layer of 200.0 g/L.

Example 4

The same procedure as Example 3 was conducted, except that the powder obtained in Example 2 was used as the powder A.

Comparative Example 1

Carried on 100 g of alumina having a specific surface area of 200 $m^2/g$ and an average pore diameter of 20 nm was dinitro-diamine platinum in a manner to achieve 0.6 wt %, followed by drying at 120° C. overnight and firing thereafter at 400° C. for 1 hour. Further, carried on 100 g of alumina having a specific surface area of 200 $m^2/g$ and an average pore diameter of 20 nm was cobalt nitrate in a manner to achieve 3 wt %, followed by drying at 120° C. overnight and firing thereafter at 400° C. for 1 hour. The same procedure as Example 3 was conducted except that the same amounts of these powders were used to provide a mixed powder A.

Herein, the specimens obtained by the above specimen adjustment were evaluated by the following manner.

<Durability Test>

Durability test of powdery catalyst was conducted by firing each of obtained powdery catalysts at 700° C. for 1 hour in an oxidizing atmosphere.

<Evaluation Manner of Conversion Ratio>

Based on a model gas shown in Table 1, there was obtained a 50%-conversion temperature during elevation from room temperature to 400° C. at 10° C./min. Further, there was obtained a conversion ratio at 400° C.

TABLE 1

| Reaction Gas Composition | |
|---|---|
| Gas composition | Stoichiometric |
| Z value (-) | 1.000 |
| A/F (-) | 14.5 |
| NO (ppm) | 1.000 |
| CO (%) | 0.6 |
| $H_2$ (%) | 0.2 |
| $O_2$ (%) | 0.6 |
| $CO_2$ (%) | 13.9 |
| HC (ppmC) | 1665 |
| $H_2O$ (%) | 10 |
| $N_2$ (balance) | remainder |

<Measuring Method of Noble Metal Dispersity>

Used for measurement of noble metal dispersity was a metal dispersity measuring device BEL-METL-3 manufactured by Bel Japan, Inc., and measurement was conducted in accordance with the following procedure. Each specimen was heated to 400° C. at 10° C./min, and then oxidation treatment was conducted for 15 minutes at 400° C. in gas flow of 100% $O_z$. Purging was then conducted for 5 minutes by 100% He gas, and a reduction treatment was conducted at 400° C. for 15 minutes in a gas of 40% $H_2$/balance He. Thereafter, the temperature was lowered down to 50° C. in a gas flow of 100% He. Then, 10% cobalt/balance He gas was pulsedly flowed in, to obtain a noble metal dispersity based on an adsorbed cobalt amount, in accordance with the following formula.

Dispersity (%)=(100×[atomic weight of carried metal]×[unit adsorbed amount])/(22414×[stoichiometric ratio]×[content rate of carried metal])
*unit adsorbed amount [$cm^3$/g]=total adsorbed amount/specimen weight     (Mathematical Formula 1)

<Measurement of Particle Diameters of Noble Metal and Transition Metal>

Evaluation was performed based on TEM-EDX measurement, by scraping down a catalyst layer from each exhaust-gas purifying catalyzer obtained by the above specimen preparation. The measurement was conducted by using an HF-2000 manufactured by Hitachi, Ltd., at an accelerating voltage of 200 kV and a cutting condition of ordinary temperature. The measuring method was to embed the powdery catalyst in an epoxy resin, and to prepare an ultra-thin slice by an ultra-microtome after the epoxy resin had cured. Dispersed states of various crystal grains were investigated by a transmission electron microscope (TEM), by using the slice. Contrasted (shadow) parts in the obtained image were focused to determine metal kinds, to measure particle diameters (Ar and Br) of the metals.

<Measurement of Conversion Ratio>

Qualitative, quantitative and state analyses of the elements of each specimen were conducted by X-ray photoelectron spectroscopy (XPS). Measurement was conducted by fixing the specimen on an indium foil while adopting a composite-type surface analyzing apparatus manufactured by PHI, under the condition that the X-ray source was Al-Kα ray (1486.6 eV, 300 W), the photoelectron extraction angle was 45° (measurement depth of 4 nm), and the measuring area was 2-mm× 0.8-mm. Upon measurement, hydrogen (hydrogen 0.2%/nitrogen) as one of compositions of exhaust gas was exposed at 400° C.×10 minutes within a pretreatment chamber attached to the XPS apparatus, and then the XPS measurement was performed.

Based on the results obtained from the TEM-EDX measurement, the platinum powdery catalyst obtained in Example 1 had an average particle diameter of 4.8 nm, and the platinum powdery catalyst obtained in Example 2 had an average particle diameter of 4.6 nm. Note that each of specimens obtained in Example 1 and Example 2 had a platinum carrying concentration of 0.3 wt % and a cobalt carrying concentration of 1.5 wt %. Further, in Example 1 and Example 2, cobalt was coniposited with alumina and brought into cobalt-aluminates. As shown in a schematic view of FIG. 5, most of platinum fine particles were existent on the cobalt-aluminates, respectively.

Following Table 2 shows a 50%-conversion-ratio temperature ° C. after endurance (after firing at 700° C.) and a conversion ratio % at 400° C. after endurance (after firing at 700° C.). Table 3 shows a dispersity (X1) at the time of preparation of catalyst (after firing at 400° C.), a dispersity (X2) after endurance (after firing at 700° C.), and X2/X1.

In Examples 3, 4 and Comparative Example 1, Comparative Example 1 had a higher 50%-conversion-ratio temperature ° C. and a lower value for a conversion ratio % at 400° C. after endurance (after firing at 700° C.), as compared with Examples 3, 4. Further, although its dispersity (X1) at the time of preparation of catalyst was high, its dispersity (X2) after endurance (after firing at 700° C.) was considerably lowered. From these results, the X1/X2 of Comparative Example 1 had a smaller value as compared with Examples 3, 4.

TABLE 2

| | 50%-conversion-ratio temperature(° C.) after endurance | | | Conversion ratio(%) at 400° C. after endurance | | |
|---|---|---|---|---|---|---|
| | HC | CO | NOx | HC | CO | NOx |
| Ex. 3 | 282 | 253 | 265 | 99 | 99 | 99 |
| Ex. 4 | 275 | 241 | 254 | 99 | 99 | 99 |
| Com. Ex. 1 | 295 | 268 | 277 | 91 | 95 | 90 |

TABLE 3

| | Dispersity (X1) at preparation of catalyst (after firing at 400° C.) | Dispersity (X2) after endurance (after firing at 700° C.) | X2/X1 |
|---|---|---|---|
| Ex. 3 | 51 | 37 | 0.73 |
| Ex. 4 | 52 | 42 | 0.81 |
| Com. Ex. 1 | 72 | 3 | 0.04 |

In this way, although the anchoring effect was exhibited when the fine particles created by mixing noble metal and transition metal were carried by alumina, such an anchoring effect was not obtained when the noble metal and transition metal were separately carried, thereby leading to a deteriorated dispersity.

Based on the above, since the noble metal and transition metal are mixed to form fine particles having an average particle diameter of 0.1 nm to 100 nm and the fine particles are provided in the core-shell structures so that the transition metal forms the composite together with the porous oxide, it becomes possible to cause the porous oxide to firmly carry the noble metal thereon by virtue of the anchoring effect. Further, since agglomeration of noble metal particles is restricted by the anchoring effect, it becomes possible to obtain a catalyst having a higher dispersity and to firmly carry the fine particles on the porous oxide.

The present invention may be embodied in other specific forms without departing from the spirit or essential characteristics thereof. The embodiments are therefore to be considered in all respects as illustrative and not restrictive, the scope of the present invention being indicated by the appended claims rather than by the foregoing description, and all changes which come within the meaning and range of equivalency of the claims are therefore intended to be embraced therein.

INDUSTRIAL APPLICABILITY

According to the present invention, there is provided a powdery catalyst having noble metal particles controlled against agglomeration, with excellent durability.

The invention claimed is:

1. A method of producing a powdery catalyst, comprising:
   preparing a fine particle within a size range of 0.1 nm to 100 nm, the fine particle comprising a noble metal particle and a transition metal material;
   placing the fine particle on a porous carrier; and
   firing the porous carrier to provide the porous carrier having a complex part comprising a composite of a transition metal material and a constituent material of the porous carrier, the complex part supporting or depositing the noble metal particle on the complex part.

2. The method of producing a powdery catalyst as claimed in claim 1, wherein the fine particle has the noble metal particle covered particles of the transition metal material.

3. The method of producing a powdery catalyst as claimed in claim 1, wherein the fine particle has a core-shell structure.

4. The method of producing a powdery catalyst as claimed in claim 1, comprising:

preparing a colloid comprising the fine particle covered by an organic protector in a dispersion medium; and putting the porous carrier in the dispersion medium, having the colloid placed on the porous carrier.

* * * * *